(12) United States Patent
Tremblay et al.

(10) Patent No.: US 6,249,861 B1
(45) Date of Patent: Jun. 19, 2001

(54) INSTRUCTION FETCH UNIT ALIGNER FOR A NON-POWER OF TWO SIZE VLIW INSTRUCTION

(75) Inventors: Marc Tremblay, Menlo Park; Graham R. Murphy, Sunnyvale; Frank C. Chiu, Mountain View, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/204,781

(22) Filed: Dec. 3, 1998

(51) Int. Cl.[7] .................................................. G06F 9/30
(52) U.S. Cl. .............................. 712/204; 712/24; 712/210
(58) Field of Search .................................. 712/204, 210, 712/24

(56) References Cited

U.S. PATENT DOCUMENTS

| | | | |
|---|---|---|---|
| 4,502,111 | * | 2/1985 | Riffe et al. ............................ 712/204 |
| 5,448,746 | * | 9/1995 | Eickemeyer et al. ................ 712/216 |
| 5,463,748 | * | 10/1995 | Schwendinger ...................... 712/204 |
| 5,581,718 | * | 12/1996 | Grochowski ......................... 712/204 |
| 5,598,544 | * | 1/1997 | Ohshima .............................. 712/204 |
| 5,761,470 | | 6/1998 | Yoshida . |

FOREIGN PATENT DOCUMENTS

| | | |
|---|---|---|
| 0718758 | 6/1996 | (EP) . |
| WO 98/06042 | 12/1998 | (WO) . |

OTHER PUBLICATIONS

D.D. Gajski and B.R. Tulpule "High–Speed Masking Rotator," Digital Processes vol. 4, Jan. 1, 1978, pp. 67–81.

* cited by examiner

*Primary Examiner*—Richard L. Ellis
(74) *Attorney, Agent, or Firm*—Skjerven Morrill MacPherson LLP

(57) ABSTRACT

The present invention provides an instruction fetch unit aligner. In one embodiment, an apparatus for an instruction fetch unit aligner includes selection logic for selecting a non-power of two size instruction from power of two size instruction data, and control logic for controlling the selection logic.

18 Claims, 11 Drawing Sheets

INSTRUCTION FETCH UNIT ALIGNER FOR A NON-POWER OF TWO SIZE VLIW INSTRUCTION

CROSS-REFERENCE TO RELATED APPLICATIONS

This application relates to application Ser. No. 09/204, 480, filed on even date herewith, entitled "A Multiple-Thread Processor For Threaded Software Applications" and naming Marc Tremblay and William Joy as inventors, the application being incorporated herein by reference in its entirety.

This application relates to application Ser. No. 09/204, 793, filed on even date herewith, entitled "Shared Instruction Cache For Multiple Processors" and naming Marc Tremblay as inventor, the application being incorporated herein by reference in its entirety.

This application relates to application Ser. No. 09/205, 121, filed on even date herewith, entitled, "Dual In-line Buffers for an Instruction Fetch Unit", and naming Marc Tremblay and Graham R. Murphy as inventors, the application being incorporated herein by reference in its entirety.

This application relates to application Ser. No. 09/205, 120, filed on even date herewith, entitled, "An Efficient Method For Fetching Instructions Having A Non-Power Of Two Size", and naming Marc Tremblay and Graham R. Murphy as inventors, the application being incorporated herein by reference in its entirety.

FIELD OF THE INVENTION

The present invention relates generally to microprocessors, and more particularly, to an instruction fetch unit aligner.

BACKGROUND

A microprocessor typically includes a cache memory for storing copies of the most recently used memory locations. The cache memory generally is smaller and faster than main memory (e.g., disk). A microprocessor also typically includes an instruction prefetch unit that is responsible for prefetching instructions for a CPU (Central Processing Unit). In particular, an instruction cache unit is typically organized in a way that reduces the amount of time spent transferring instructions having a power of two size into the prefetch unit. For example, a 256-bit bus (256 bits=4×8 bytes=32 bytes) connecting the instruction cache unit and the prefetch unit allows a 32-byte instruction prefetch unit to fetch 32 bytes of instruction data in a single cycle of the microprocessor.

SUMMARY

The present invention provides an instruction fetch unit aligner. For example, the present invention provides a cost-effective and high performance apparatus for an instruction fetch unit of a microprocessor that executes instructions having a non-power of two size.

In one embodiment, an apparatus for an instruction fetch unit aligner includes selection logic of an instruction aligner that extracts and aligns a non-power of two size instruction (e.g., 5, 10, 15, or 20 bytes of instruction data) from power of two size instruction data (e.g., 64 bytes of instruction data), and control logic of the instruction aligner for controlling the selection logic. The selection logic is implemented as multiplexer logic for selecting the non-power of two size instruction from the power of two size instruction data. The extraction and alignment of the non-power of two size instruction from the power of two size instruction data is performed within one clock cycle of the microprocessor. For example, four 2:1 multiplexers that each select 8 bytes of the power of two size instruction data can be used to select 32 bytes of instruction data from 64 bytes of instruction data, in which the non-power of two size instruction is within the selected 32 bytes of instruction data, and the multiplexer logic provides 32:1 mux functionality using eight 4:1 multiplexers and four 8:1 multiplexers for every 4 bits of the power of two size instruction data. A reorder channel that appropriately reorders the bits output from the multiplexer logic is also provided.

Other aspects and advantages of the present invention will become apparent from the following detailed description and accompanying drawings.

DETAILED DESCRIPTION

A typical instruction set architecture (ISA) for a microprocessor specifies instructions has a power of two size, which can be aligned on a power of two boundary in a conventional cache memory. A typical ISA includes 32-bit instructions that are a fixed size such as for RISC (Reduced Instruction Set Computer) processors. The 32-bit instructions are typically aligned on a 32-bit boundary in a conventional instruction cache unit. The 32-bit instructions can be prefetched from the instruction cache unit in one clock cycle using a conventional 32-bit data path between the prefetch unit and the instruction cache unit.

However, new instruction set architectures may include instructions having a non-power of two size. To efficiently fetch instructions having a non-power of two size, a method in accordance with one embodiment of the present invention includes fetching at least two sequential cache lines for storage in line buffers of an instruction fetch unit of a microprocessor, and then efficiently extracting and aligning all the bytes of a non-power of two size instruction from the line buffers. This approach allows for a standard instruction cache architecture, which aligns cache lines on a power of two boundary, to be used. This approach also reduces the data path between the instruction cache and the instruction fetch unit. This approach sustains a fetch of always at least one sequential instruction per clock cycle of the microprocessor.

For example, an ISA can require supporting execution of instruction packets such as VLIW (Very Long Instruction Word) packets that are either 5, 10, 15, or 20 bytes wide. For certain applications such as graphics or media code, there may predominantly be 20-byte wide VLIW packets. If a 20-byte VLIW packet is executed per clock cycle (e.g., at a peak execution rate), then to maintain this peak execution rate, the instruction fetch unit fetches at least 20 bytes per clock cycle from the instruction cache unit.

Figure 1:
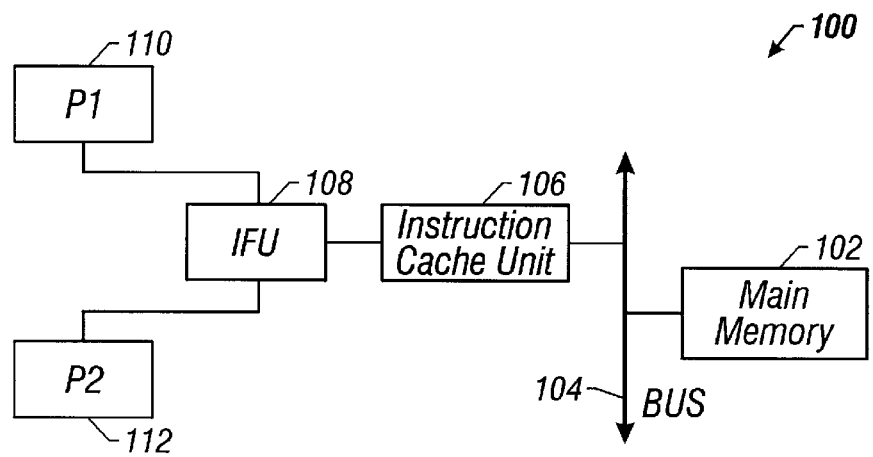
FIG. 1 is a block diagram of a microprocessor that includes an instruction fetch unit in accordance with one embodiment of the present invention.

FIG. 1 is a block diagram of a microprocessor 100 that includes an instruction fetch unit (IFU) 108 in accordance with one embodiment of the present invention. In particular, microprocessor 100 includes a main memory 102 connected to a bus 104, an instruction cache unit 106 connected to bus 104, instruction fetch unit 108 connected to instruction cache unit 106, and P1 processor 110 and P2 processor 112 each connected to instruction fetch unit 108. In one embodiment, P1 processor 110 is provided (i.e., instead of P1 processor 110 and P2 processor 112), and P1 processor 110 is connected to instruction fetch unit 108.

In one embodiment, instruction cache unit 106 is a conventional 16-kilobyte dual-ported cache that uses a well-known (standard) cache architecture of two-way set associative, 32-byte lines (e.g., in order to minimize cost and timing risk). Instruction cache unit 106 returns a new 32-byte cache line to instruction fetch unit 108 during each clock cycle of microprocessor 100, and thus, instruction cache unit 106 can satisfy an execution rate of, for example, a 20-byte VLIW packet per clock cycle of microprocessor 100.

However, the 20-byte VLIW packets may not be aligned on the 32-byte cache line boundaries of instruction cache unit 106. VLIW packets can start on any byte boundary, and an empirical observation reveals that a significant number of the VLIW packets often start on a first cache line and continue onto a second cache line of two sequential cache lines. For VLIW packets that span two cache lines, two clock cycles would typically be needed to fetch the entire VLIW packet before executing the VLIW packet. As a result, the execution pipeline of microprocessor 100 may be reduced to approximately one half, thus resulting in a significant performance degradation.

Accordingly, instruction fetch unit 108 stores two instruction cache lines fetched from instruction cache unit 106 to ensure that instruction fetch unit 108 can provide the next VLIW packet, regardless of whether or not the VLIW packet spans two cache lines, in a single clock cycle. In particular, instruction fetch unit 108 prefetches ahead of execution, predicts branch outcomes, and maintains two sequential cache lines of unexecuted instructions. For example, a 20-byte VLIW packet is extracted from the two sequential instruction cache lines of instruction fetch unit 108 and then appropriately aligned, and the extraction and alignment is completed in one clock cycle (assuming the two sequential cache lines stored in instruction fetch unit 108 represent valid data). For sequential execution, instruction fetch unit 108 provides at least one VLIW packet per clock cycle, regardless of whether or not the VLIW packet spans two cache lines in instruction cache unit 106.

In one embodiment, instruction cache unit 106 is a shared instruction cache unit for multiple processors (e.g., PI processor 110 and P2 processor 112). A shared instruction cache for multiple processors is disclosed in commonly assigned and co-pending U.S. patent application Ser. No. 09/204,793 and incorporated herein by reference in tis entirety.

A typical instruction fetch unit provides a 4-byte granularity. In contrast, instruction fetch unit 108 provides a 1-byte granularity and can fetch instructions with a 1-byte granularity. Instruction fetch unit 108 extracts and aligns a 5, 10, 15, or 20 byte VLIW packet from 64 bytes of instruction data stored in instruction fetch unit 108 (e.g., an instruction cache line of an instruction cache unit 106 is 32-bytes). Instruction fetch unit 108 efficiently performs the align operation as discussed below.

Figure 2:
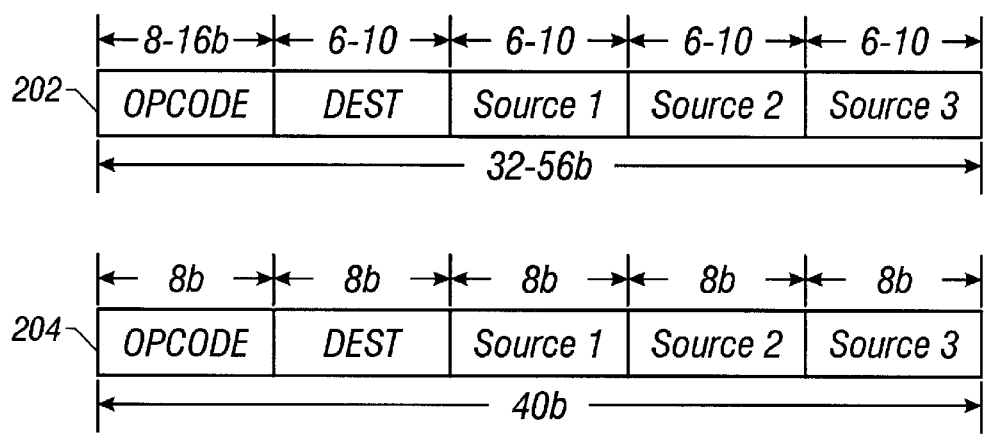
FIG. 2 shows various formats of instructions having a non-power of two size.

FIG. 2 shows various formats of instructions having a non-power of two size. In particular, instruction format 202 shows an instruction format for a variable size opcode which includes an 8-bit to 16-bit opcode, a 6-bit to 10-bit destination, a 6-bit to 10-bit source 1, a 6-bit to 10-bit source 2, and a 6-bit to 10-bit source 3. Format 202 ranges from 32 bits to 56 bits. Instruction format 204 shows a 40-bit instruction format which includes an 8-bit opcode, an 8-bit destination, an 8 bit source 1, an 8-bit source 2 and an 8-bit source 3.

Storing non-power of two size instructions, such as shown in instruction format 204, in a conventional DRAM (Dynamic Random Access Memory) or other conventional cache memory that includes cache lines of power of two size (e.g., because of binary addressing) results in non-aligned instructions being stored in the instruction cache. Thus, one embodiment of the present invention allows for the fetching of non-power of two size instructions from an instruction cache unit in one clock cycle of the microprocessor. For example, a typical DRAM has a width of a power of two number of bits (e.g., 32 bytes). Similarly, on-chip memory is typically organized using power of two boundaries and addressing. Thus, non-power of two instruction sets, such as shown in the instruction format 204 (i.e., a forty bit or five byte instruction), are not necessarily aligned when stored in instruction cache unit 106.

Figure 3:
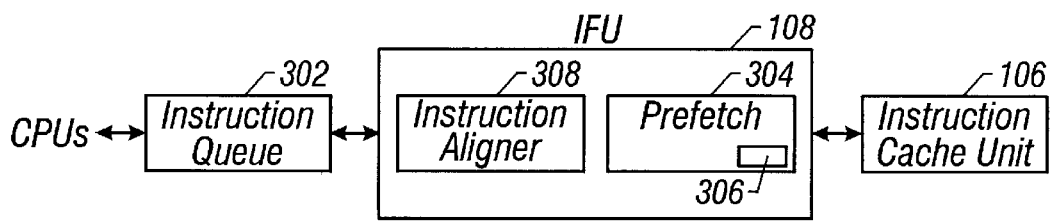
FIG. 3 is a block diagram of an instruction queue and the instruction fetch unit of FIG. 1 shown in greater detail in accordance with one embodiment of the present invention.

FIG. 3 is a block diagram of an instruction queue 302 and instruction fetch unit 108 shown in greater detail in accordance with one embodiment of the present invention. Instruction fetch unit 108 is connected to instruction cache unit 106 via a conventional 32-byte data path. Instruction fetch unit 108 includes a prefetch unit 304. Prefetch unit 304 includes dual in-line buffers 306. Dual in-line buffers 306 are implemented as, for example, two 32-byte wide registers. Dual in-line buffers 306 store two sequential lines of instructions fetched from instruction cache unit 106. By storing two sequential lines of instructions fetched from instruction cache unit 106, instruction fetch unit 108 essentially ensures that the subsequent instruction is stored in dual in-line buffers 306, regardless of whether or not it represents a non-aligned instruction (e.g., the instruction spans two lines in instruction cache unit 106). Thus, instruction fetch unit 108 solves the problem of having to request two instruction fetches from instruction cache unit 106, which typically causes a waste of at least one clock cycle of the microprocessor.

Instruction fetch unit 108 also includes an instruction aligner 308. Instruction aligner 308 extracts and aligns the non-power of two size instruction from instruction data stored in dual in-line buffers 306. For example, for a 40-bit instruction, instruction aligner 308 extracts the 40-bit instruction from the 64 bytes of data stored in dual in-line buffers 306. Instruction aligner 308 then efficiently aligns the 40-bit instruction, as further discussed below.

In one embodiment, microprocessor 100 includes four processors or CPUs (Central Processing Units). Microprocessor 100 executes up to four instructions per cycle. Instruction fetch unit 108 provides up to four instructions per cycle to instruction queue 302 to maintain the peak execution rate of four instructions per cycle. For example, for a 40-bit instruction set, which defines 40-bit instruction sizes, instruction fetch unit 108 provides up to 160 bits per cycle in order to provide four instructions per cycle. Thus, instruction fetch unit 108 provides up to 20-bytes of instruction data (e.g., a 20-byte VLIW packet) to instruction queue 302 per cycle. Because dual in-line buffers 306 store 64 bytes of instruction data, instruction aligner 308 is responsible for extracting and appropriately aligning, for example, the 20 bytes of instruction data for the next cycle that is within the 64 bytes of instruction data stored in dual in-line buffers 306. Accordingly, in one embodiment, an efficient method for fetching instructions having a non-power of two size is provided.

Figure 4:
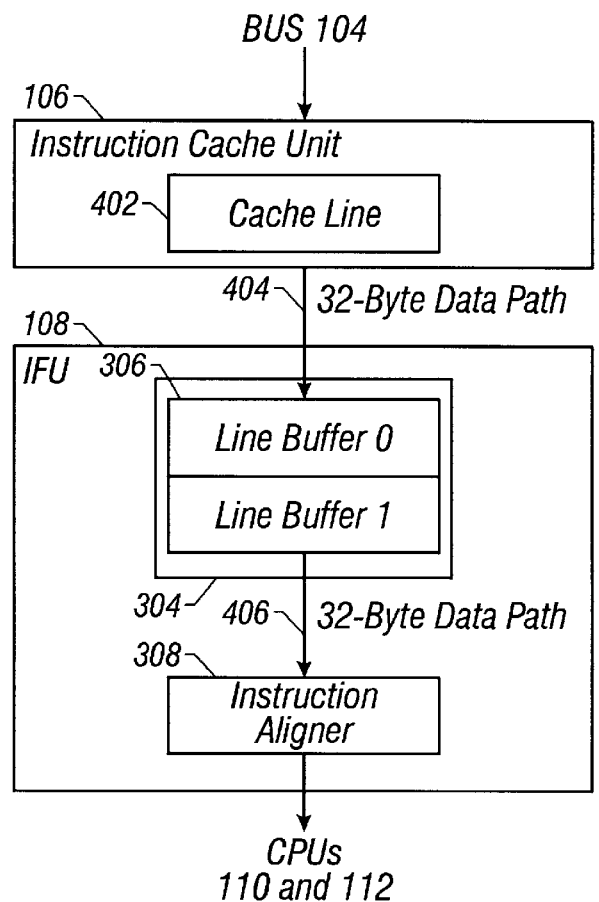
FIG. 4 is a functional diagram of the instruction cache unit of FIG. 1 connected to the instruction fetch unit of FIG. 1 in accordance with one embodiment of the present invention.

FIG. 4 is a functional diagram of instruction cache unit 106 connected to instruction fetch unit 108 in accordance with one embodiment of the present invention. A cache line 402 that includes 32 bytes of instruction data stored in instruction cache unit 106 is sent to instruction fetch unit 108 via a 32-byte data path 404. Instruction fetch unit 108 includes dual in-line buffers 306. Dual in-line buffers 306 include a line buffer 0 that is 32-bytes wide and a line buffer 1 that is 32-bytes wide. For example, line buffer 0 and line buffer 1 can be implemented as registers of instruction fetch unit 108, or line buffer 0 and line buffer 1 of dual in-line buffers 306 can be implemented as two sets of enable-reset flip-flops, in which the flip-flops can be stacked (two in one bit slice). The 32-bytes of data are then extracted from dual in-line buffers 306 and transmitted via a 32-byte data path 406 to instruction aligner 308. Instruction aligner 308 extracts and aligns the instruction (e.g., 10 bytes of instruction data) from the 32 bytes of instruction data and then transmits the extracted and aligned instruction for appropriate execution on processors 110 and 112 of microprocessor 100.

Dual in-line buffers 306 maintain two sequential lines of instruction data fetched from instruction cache unit 106. After the instruction data is extracted from dual in-line buffers 306, instruction fetch unit 108 fetches the next sequential line of instruction data for storage in dual in-line buffers 306. For example, based on the address of the fetched data (e.g., if the fifth address bit is zero, then the fetched data is loaded into line buffer 0, else the fetched data is loaded into line buffer 1), either line buffer 0 or line buffer 1 is purged, and the next sequential line of cache memory (e.g., cache line 402 of instruction cache unit 106) is fetched and stored in the now purged line buffer 0 or line buffer 1. In steady state mode, instruction fetch unit 108 maintains a rate of fetching of 32 bytes of instruction data per cycle. Because only up to 20 bytes of instruction data are consumed per cycle in the 20-byte VLIW packet example, and instruction data is stored in memory sequentially, instruction fetch unit 108 can generally satisfy the peak execution rate of microprocessor 100, such as 20 bytes of instruction data or four instructions per multi-processor cycle of microprocessor 100.

The instruction data path within instruction fetch unit 108 involves, for example, selecting a 20-byte wide byte-aligned field from 64 bytes of data stored in dual in-line buffers 306. The 20-byte wide byte-aligned field is buffered (e.g., stored in instruction queue 302) and then appropriately presented to the CPUs (e.g., 4 different processors). For a 20-byte VLIW packet, the data path size between instruction cache unit 106 and instruction fetch unit 108 can be 32 bytes, because the cache line size is 32 bytes.

However, extracting a 20-byte wide byte-aligned field from 64 bytes of non-aligned instruction data efficiently represents a challenging problem. Accordingly, instruction fetch unit 108 efficiently performs a rotate and truncate of a 20-byte wide byte-aligned field from 64 bytes of non-aligned instruction data, in which, for example, 20 bytes is the maximum size of a VLIW packet, and 64 bytes of instruction data is prefetched from instruction cache unit 106 in accordance with one embodiment of the present invention, as further discussed below.

Figure 5:
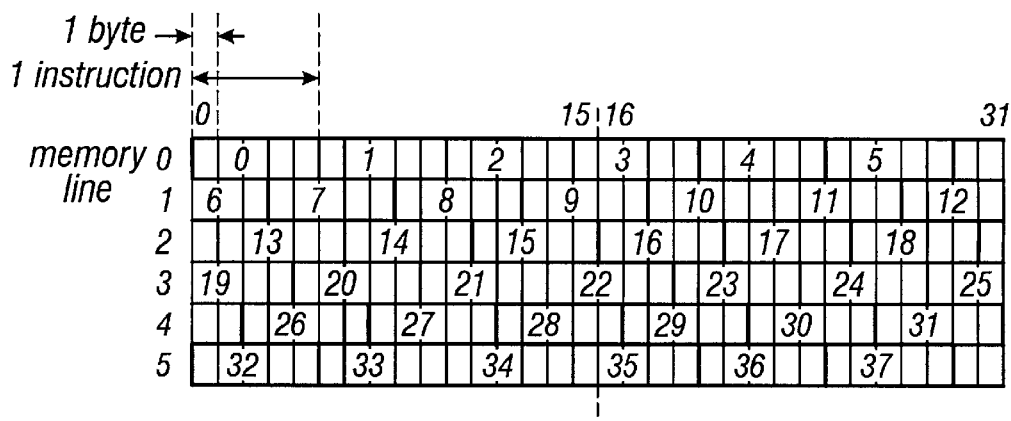
FIG. 5 is a diagram of possible 5-byte instruction positions within a 32-byte wide cache memory.

FIG. 5 is a diagram of possible 5-byte instruction positions within a 32-byte wide cache memory. Each 32-byte aligned location is called a cache memory line. An instruction can be located in 32 unique positions in the five cache memory lines (e.g., cache memory lines 0–5) before the position sequence of FIG. 5 repeats.

In one embodiment, instruction aligner 308 can select an instruction from any one of these 32 different positions along with 0–3 subsequent instructions (assuming a VLIW packet that includes up to four instructions). In order to accomplish this task, instruction aligner 308 uses a 5-bit offset pointer indicating where in the 32-byte data path the first byte of the General Functional Unit (GFU) instruction is found for a multiprocessor that includes, for example, four different processors such as the GFU and three Media Functional Units (MFUs). Instruction aligner 308 then left justifies the first byte along with up to 19 subsequent bytes to provide the instruction packet (e.g., the VLIW packet). If the instruction packet spans (i.e., crosses) a cache memory line boundary, then instruction aligner 308 combines the contents of line buffer 0 and line buffer 1 of dual in-line buffers 306.

Figure 6:
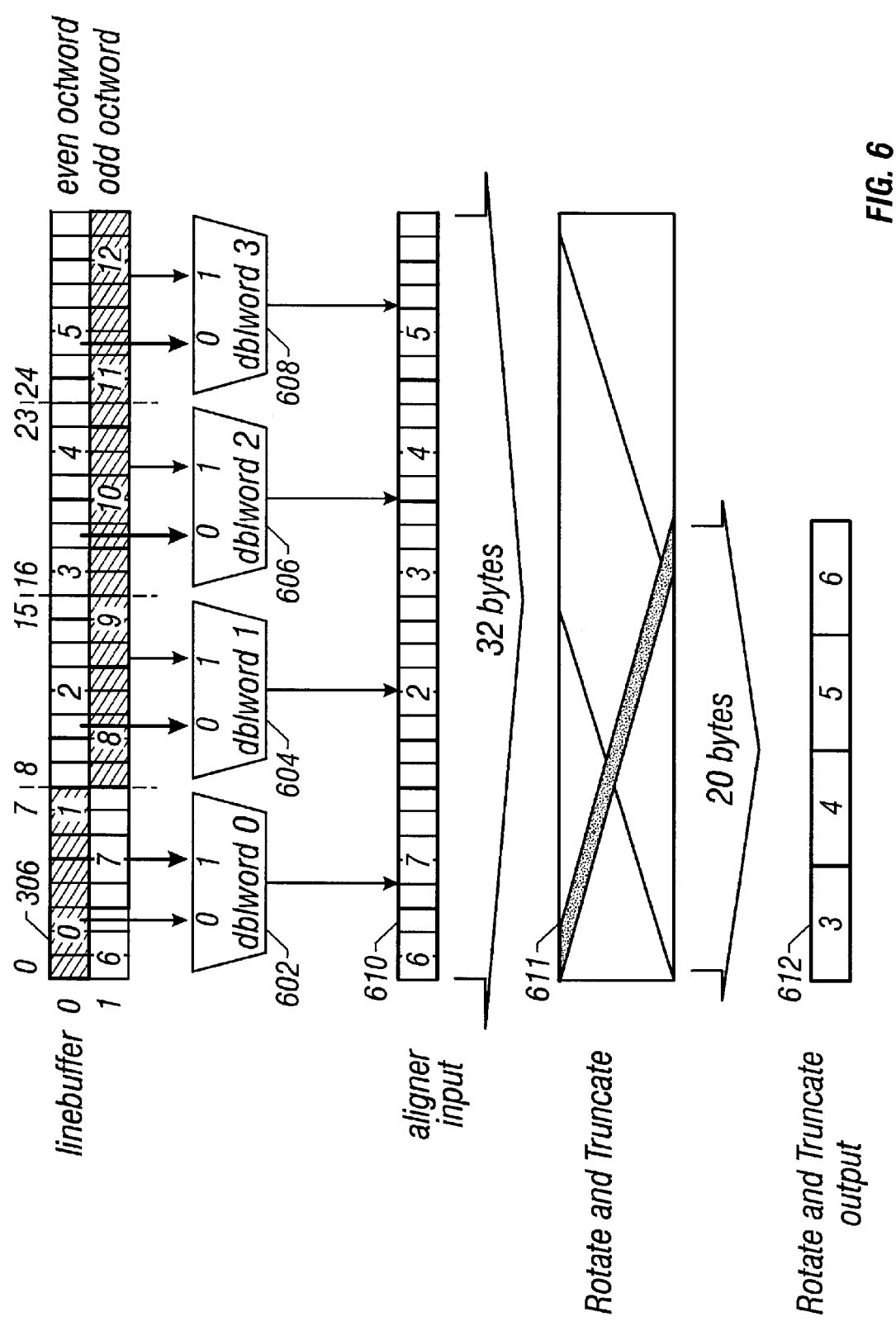
FIG. 6 is a functional diagram of the operation of the instruction fetch unit of FIG. 4 shown in greater detail in accordance with one embodiment of the present invention.

FIG. 6 is a functional diagram of the operation of instruction fetch unit 108 of FIG. 4 shown in greater detail in accordance with one embodiment of the present invention. Each quarter of a line buffer (e.g., line buffer 0 and line buffer 1 of dual in-line buffers 306) includes 8 bytes, or two words, which together represent a double word. Thus, each line buffer includes four double words, which together make up an outward. The first double word in the line buffer is numbered 0, followed by 1, 2, and 3, respectively. Line buffer 0 (e.g., line buffer 0 of dual in-line buffers 306) holds even octwords, because it includes memory lines at even octword addresses (e.g., 0, 64, and 128). Line buffer 1 (e.g., line buffer 1 of dual in-line buffers 306) holds odd octwords, because it includes memory lines at odd octword addresses (e.g., 32, 96, and 160). Instruction fetch unit 108 includes four 2:1 doubleword muxes to concatenate any four doublewords stored in line buffer 0 and line buffer 1. Four doublewords (32 bytes) provide the data needed to extract a 20-byte instruction such as a VLIW packet, which is a maximum of 20 bytes (assuming both of the line buffers include valid data).

In one embodiment, the instruction data path is implemented as an instruction data path megacell that includes the following: dual in-line buffers 306 that hold two cache lines (64 bytes in total) fetched from instruction cache unit 106, doubleword muxes 602, 604, 606, and 608 that select 32 bytes of instruction data from dual in-line buffers 306 to provide aligner input 610, rotate and truncate logic unit 611 of instruction aligner 308 that selects a VLIW packet by left justifying and truncating the 32 bytes presented by the double word muxes to provide rotate and truncate output 612.

Specifically, FIG. 6 shows an example of a four instruction VLIW packet starting at byte 15 of line buffer 0 of dual in-line buffers 306 and ending at byte 2 of line buffer 1 of dual in-line buffers 306. The VLIW packet passes through mux input 0 of doubleword muxes 1 (604), 2 (606), and 3 (608), and mux input 1 of doubleword mux 0 (602). The result is a 32-byte aligner input 610 that includes instructions 3, 4, 5, and 6, which represent a VLIW packet. Doubleword muxes 602, 604, 606, and 608 represent the first level of muxes that select all the doublewords necessary to obtain the minimal power of two size aligned super set of the desired VLIW packet (e.g., selects 32 bytes of instruction data that include the 20-byte VLIW packet). Aligner input 610 is provided to rotate and truncate unit 611 of instruction aligner 308. Rotate and truncate unit 611 performs a rotate and truncate function that extracts and aligns the 20-byte VLIW packet from 32-byte aligner input 610 and, in particular, rotates and truncates the 32 bytes of instruction data in order to output 20 bytes of instruction data as rotate and truncate output 612 that represents a byte-aligned VLIW packet.

Referring to the selection of bytes of instruction data stored in dual in-line buffers 306, the selection is performed by using the known start address of the VLIW packet, and then extracting the next sequential bytes using doubleword muxes 602, 604, 606, and 608 to provide 32-byte aligner input 610. For example, a VLIW packet can be 5, 10, 15, or 20 bytes (e.g., it depends on whether or not the compiler generated 1, 2, 3, or 4 instructions in parallel, that is, for execution in a single cycle on the multi-processor), in which the first two bits of the VLIW packet represent a packet header that indicates how many instructions are included in the VLIW packet. Thus, when a VLIW packet is decoded, it can be determined that only 10 bytes of instruction data are needed (e.g., two instructions were compiled for execution in parallel in a particular cycle).

Aligner input 610 represents 32 bytes of instruction data within which resides up to 20 bytes of non-aligned VLIW data. Rotate and truncate unit 611 performs a rotate and truncate operation that extracts and aligns non-power of two size instruction data from the power of two size instruction data (e.g., a 20-byte VLIW packet from 32 bytes of aligner input 610) to provide rotate and truncate output 612. The rotate and truncate operation can be implemented using twenty 32:1 muxes using two levels of muxes, eight 4:1 muxes, each of which connects to an 8:1 mux to effectively provide a 32:1 mux, which represents a brute force approach. However, a more efficient approach is discussed below.

Figure 7:
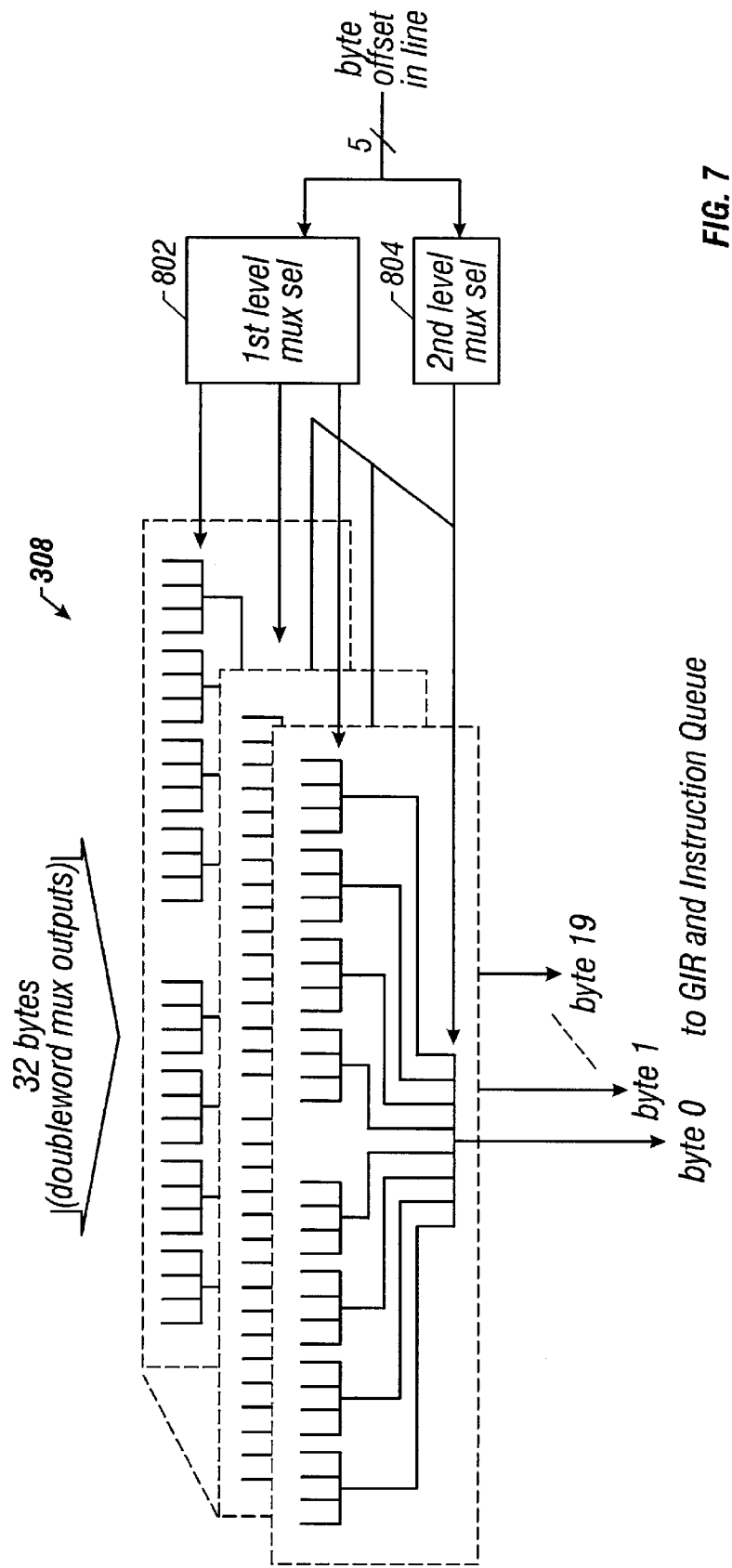
FIG. 7 is a functional diagram of a multi-level implementation of the instruction aligner of FIG. 3 in accordance with one embodiment of the present invention.

FIG. 7 is a functional diagram of a multi-level implementation of instruction aligner 308 in accordance with one embodiment of the present invention. In particular, instruction aligner 308 is implemented using two levels of muxes, which includes a first level mux select 802 and a second level mux select 804. The first level of muxes includes eight 4:1 byte-wide muxes. The second level of muxes includes an 8:1 byte-wide mux. Logically, there is a two-level mux structure for each bit of the 20 bytes input to instruction aligner 308. Mux select controls 802 and 804 are updated every cycle in order to sustain alignment of one VLIW packet per cycle. For example, instruction aligner 308 can be implemented as a megacell that is organized with a stacked bit cell placement.

Figure 8:
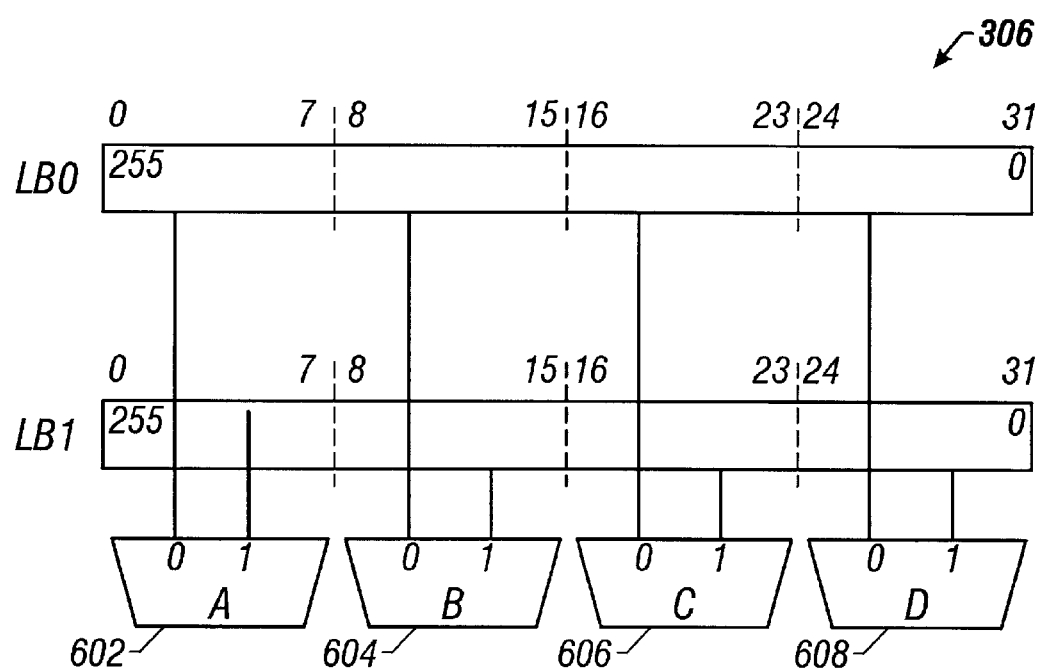
FIG. 8 is a block diagram of the line buffers connected to the double word muxes of the instruction fetch unit of FIG. 6 shown in greater detail in accordance with one embodiment of the present invention.

FIG. 8 is a block diagram of dual in-line buffers 306 connected to double word muxes 602, 604, 606, and 608 shown in greater detail in accordance with one embodiment of the present invention. Doubleword muxes 602, 604, 606, and 608 select 32 bytes out of the 64 bytes stored in dual in-line buffers 306, which include line buffer 0 (32 bytes) and line buffer 1 (32 bytes). The 32 bytes of data selected by doubleword muxes 602, 604, 606, and 608 are then transmitted to rotate and truncate unit 611 of the instruction data path as discussed above with respect to FIG. 6. Doubleword muxes 602, 604, 606, and 608 are essentially 2:1 muxes that select a doubleword (8 bytes) from either line buffer 0 (even octword) or line buffer 1 (odd octword). Doubleword muxes 602, 604, 606, and 608 are used to take advantage of the fact that at most 20 bytes of the 32 bytes of instruction data will be used. The granularity of the muxes may be set to any size down to single-byte granularity. The doubleword granularity is chosen based upon simplification of truth tables as shown in Table 1 and Table 2 (shown below) in accordance with one embodiment of the present invention.

TABLE 1

| | | Doubleword Mux Selects | | | | | | | |
| | | Mux A | | Mux B | | Mux C | | Mux D | |
| Byte Offsets | {PC[5],AOR[4:2]} | Sel0 | Sel1 | Sel0 | Sel1 | Sel0 | Sel1 | Sel0 | Sel1 |
| 0–3 | 0000 | 1 | 0 | 1 | 0 | 1 | 0 | X | X |
| 4–7 | 0001 | 1 | 0 | 1 | 0 | 1 | 0 | 1 | 0 |
| 8–11 | 0010 | X | X | 1 | 0 | 1 | 0 | 1 | 0 |
| 12–15 | 0011 | 0 | 1 | 1 | 0 | 1 | 0 | 1 | 0 |
| 16–19 | 0100 | 0 | 1 | X | X | 1 | 0 | 1 | 0 |
| 20–23 | 0101 | 0 | 1 | 0 | 1 | 1 | 0 | 1 | 0 |
| 24–27 | 0110 | 0 | 1 | 0 | 1 | X | X | 1 | 0 |
| 28–31 | 0111 | 0 | 1 | 0 | 1 | 0 | 1 | 1 | 0 |

TABLE 1-continued

Doubleword Mux Selects

| Byte Offsets | {PC[5],AOR[4:2]} | Mux A Sel0 | Mux A Sel1 | Mux B Sel0 | Mux B Sel1 | Mux C Sel0 | Mux C Sel1 | Mux D Sel0 | Mux D Sel1 |
|---|---|---|---|---|---|---|---|---|---|
| 32–35 | 1000 | 0 | 1 | 0 | 1 | 0 | 1 | X | X |
| 36–39 | 1001 | 0 | 1 | 0 | 1 | 0 | 1 | 0 | 1 |
| 40–43 | 1010 | X | X | 0 | 1 | 0 | 1 | 0 | 1 |
| 44–47 | 1011 | 1 | 0 | 0 | 1 | 0 | 1 | 0 | 1 |
| 48–51 | 1100 | 1 | 0 | X | X | 0 | 1 | 0 | 1 |
| 52–55 | 1101 | 1 | 0 | 1 | 0 | 0 | 1 | 0 | 1 |
| 56–59 | 1110 | 1 | 0 | 1 | 0 | X | X | 0 | 1 |
| 60–63 | 1111 | 1 | 0 | 1 | 0 | 1 | 0 | 0 | 1 |

TABLE 2

Optimized Doubleword Mux Selects

| Byte Offsets | {PC[5],AOR[4:3]} | Mux A Sel0 | Mux A Sel1 | Mux B Sel0 | Mux B Sel1 | Mux C Sel0 | Mux C Sel1 | Mux D Sel0 | Mux D Sel1 |
|---|---|---|---|---|---|---|---|---|---|
| 0–7 | 000 | 1 | 0 | 1 | 0 | 1 | 0 | 1 | 0 |
| 8–15 | 001 | 0 | 1 | 1 | 0 | 1 | 0 | 1 | 0 |
| 16–23 | 010 | 0 | 1 | 0 | 1 | 1 | 0 | 1 | 0 |
| 24–31 | 011 | 0 | 1 | 0 | 1 | 0 | 1 | 1 | 0 |
| 32–39 | 100 | 0 | 1 | 0 | 1 | 0 | 1 | 0 | 1 |
| 40–47 | 101 | 1 | 0 | 0 | 1 | 0 | 1 | 0 | 1 |
| 48–55 | 110 | 1 | 0 | 1 | 0 | 0 | 1 | 0 | 1 |
| 56–63 | 111 | 1 | 0 | 1 | 0 | 1 | 0 | 0 | 1 |

For Table 2, the equations for the doubleword mux selects based upon the optimization are as follows:

Mux A, Sel0=(!PC[5]&& !AOR[4]&& !AOR[3]) II (PC[5]&& AOR[4]) II (PC5&& AOR3);

Mux A, Sel1=(PC[5]&& !AOR[4]&& !AOR[3]) II (!PC[5]&& AOR[4]) II (PC5&& AOR3);

Mux B, Sel0=(!PC[5]&& !AOR[4]) II (PC[5]&& AOR[4]);

Mux B, Sel1=(!PC[5]&& !AOR[4]) II (PC[5]&& !AOR[4]);

Mux C, Sel0=(PC[5]&& AOR[4]&& AOR[3]) II (!PC[5] && !AOR[4]) II (!PC5&& !AOR3);

Mux C, Sel1=(!PC[5]&& AOR[4]&& AOR[3]) II (PC[5] && !AOR[4]) II (PC5&& !AOR3);

Mux D, Sel0=!PC[5]; and

Mux D, Sel1=!PC[5].

Figure 9:
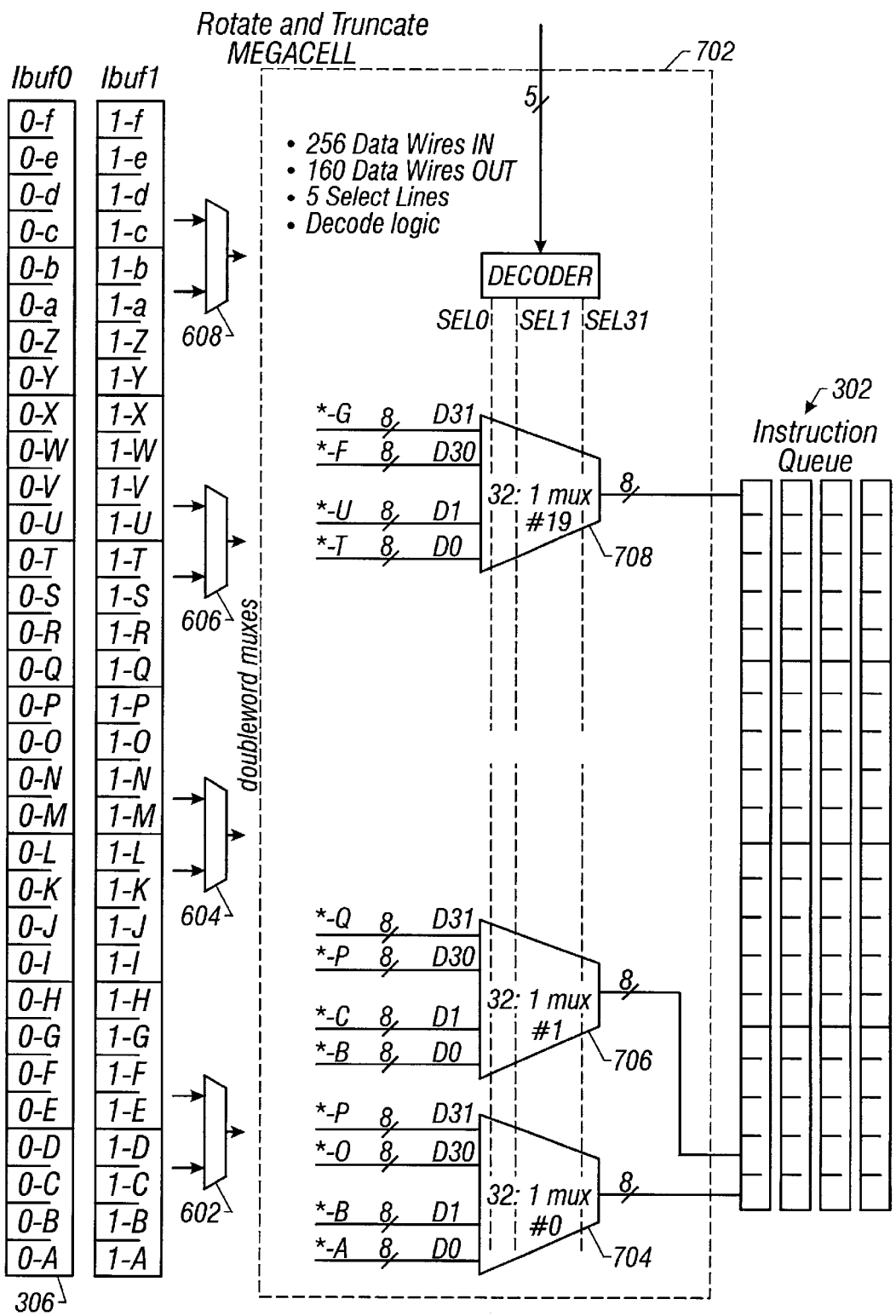
FIG. 9 is functional diagram of the operation of the rotate and truncate unit of FIG. 6 shown in greater detail in accordance with one embodiment of the present invention.

FIG. 9 is a functional diagram of the operation of rotate and truncate unit 611 shown in greater detail in accordance with one embodiment of the present invention. In particular, rotate and truncate unit 611 includes a rotate and truncate megacell 702. Rotate and truncate megacell 702 performs the functionality of twenty 32:1 byte-wide muxes. The inputs to each of the 32:1 muxes come from the outputs of doubleword muxes 602, 604, 606, and 608. The inputs to doubleword muxes 602, 604, 606, and 608 come from line buffer 0 and line buffer 1 of dual in-line buffers 306. The byte positions in the line buffers 0 and 1 are labeled [0A . . . 0Z, 0a . . . 0f] for line buffer 0 and [1A . . . 1Z, 1a . . . 1f] for line buffer 1. The inputs to each consecutive 32:1 mux in rotate and truncate megacell 702 are identical to the previous mux, except the ordering is rotated to the left by one byte. Accordingly, this can simplify the rotate and truncate megacell implementation as follows: inputs to each mux can be routed identically, and the 32-byte mux select bus can be rotated one position for each mux, mux #0 (704), mux #1 (706), . . . , and mux #19 (708). If the correct double words are provided to rotate and truncate megacell 702, then only one set of decode logic is needed to specify the shift amount. The rotated and truncated output from rotate and truncate unit 611 is transmitted to instruction queue 302.

Figure 10:
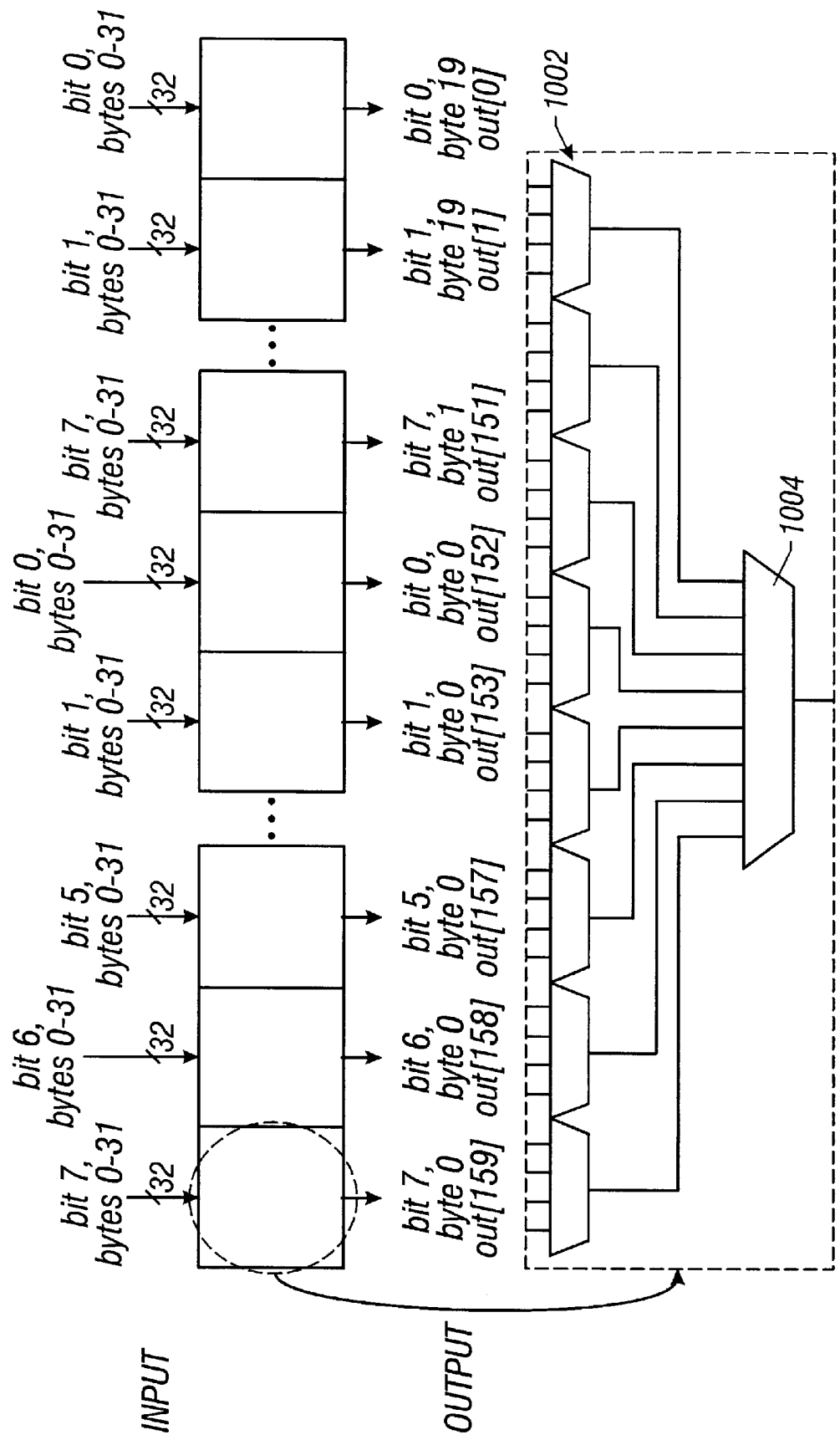
FIG. 10 is a functional diagram of a symbolic implementation of the rotate and truncate unit of FIG. 6 in accordance with one embodiment of the present invention.

FIG. 10 is a functional diagram of a symbolic implementation of rotate and truncate unit 611 in accordance with one embodiment of the present invention. Rotate and truncate unit 611 receives the 32 bytes of instruction data presented by doubleword muxes 602, 604, 606, and 608 and performs a rotation to left justify the byte at the address offset. Rotate and truncate unit 611 then truncates the instruction data to provide, for example, a 20-byte VLIW packet. Thus, rotate and truncate unit 611 essentially implements the functionality of a 32:1 mux. The primary function is to map any one of 32 bytes to, for example, each one of the 20 bytes in a 20-byte VLIW packet. Because a 32:1 mux is expensive from a floor planning and circuit implementation standpoint, rotate and truncate unit 611 is implemented as a two-level 32:1 mux in accordance with one embodiment of the present invention. A first level 1002 includes eight 4:1 muxes for every bit of the aligner input. A second level 1004 includes one 8:1 mux for every bit of the aligner input.

However, by recognizing that all the inputs are the same for bit n of each byte of bytes 0–19 (assuming a 20-byte VLIW packet), some combining of bits is possible to reduce wiring in the rotate and truncate implementation. Accordingly, in one embodiment, the muxes for bit n for 4 bytes are grouped together. The bit ordering of the first few bits is discussed below with respect to FIG. 11. Because the bits of the VLIW packet are produced out of order, an additional routing channel is used to "re-order" the bits. The grouping size of 4 bytes means that the channel must be wide enough to re-order 32 bits (e.g., a routing overhead of approximately 50–60 um). In each 4-byte wide grouping (bit n for 4 bytes), two levels of muxes can be used to implement the 32:1 mux for each bit. Ordering of the inputs to the eight 4:1 muxes in generation of the selects (select or control signals) allows the same eight 4:1 muxes to be used for each bit. Thus, eight 4:1 muxes and four 8:1 muxes are used for every 4 bits, instead of eight 4:1 and one 8:1 mux for every bit, which results in a reduction of muxes from 1440(9×160) to 480 (12×40).

Figure 11:
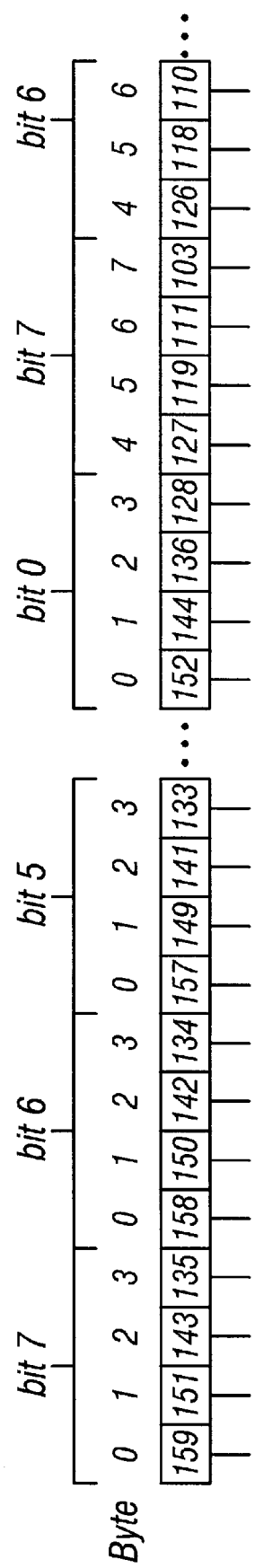
FIG. 11 is a functional diagram of a rotate and truncate bit ordering in accordance with one embodiment of the present invention.

FIG. 11 is a functional diagram of a rotate and truncate bit ordering in accordance with one embodiment of the present invention. Because 32 inputs span across 4 bits instead of 1, the bit slice pitch can be reduced by using the rotate and truncate bit ordering as shown in FIG. 11. For example, a 14.34 um (microns) pitch can be used instead of a 25 um pitch, which translates into a savings of about 750 um in the width of the instruction data path.

For example, assuming 20 bytes of instruction data, such as a 20-byte VLIW packet, channel 1206 reorders the 160 bits or 20 bytes of data from bit number 159 in descending order to bit number 0. Because not all of the outputs of the eight 4:1 muxes are necessarily selected, "do not care" conditions can be provided in the mux selection or control logic. Thus, this embodiment enables some combination of the 4:1 mux selects. The controls of the muxes are generated based upon the offset in the address offset register (not shown). The controls for each 4:1 mux (muxes A, B, C, D, E, F, G, and H) and each 8:1 mux (0, 1, 2, and 3) can be shared across the entire rotate and truncate unit if the bits are ordered carefully. A truth table for selected mux select control signals is shown below in Tables 3 and 4.

TABLE 3

| AOR | | | Mux E | | | | Mux F | | | | Mux G | | | | Mux H | | | |
|---|---|---|---|---|---|---|---|---|---|---|---|---|---|---|---|---|---|---|
| | | 0 | 1 | 2 | 3 | 0 | 1 | 2 | 3 | 0 | 1 | 2 | 3 | 0 | 1 | 2 | 3 |
| 00000 | 0 | X | X | X | X | X | X | X | X | X | X | X | X | X | X | X | X |
| 00001 | 1 | 1 | 0 | 0 | 0 | X | X | X | X | X | X | X | X | X | X | X | X |
| 00010 | 2 | 1 | 0 | 0 | 0 | 1 | 0 | 0 | 0 | X | X | X | X | X | X | X | X |
| 00011 | 3 | 1 | 0 | 0 | 0 | 1 | 0 | 0 | 0 | 1 | 0 | 0 | 0 | X | X | X | X |
| 00100 | 4 | 1 | 0 | 0 | 0 | 1 | 0 | 0 | 0 | 1 | 0 | 0 | 0 | 1 | 0 | 0 | 0 |
| 00101 | 5 | X | X | X | X | 1 | 0 | 0 | 0 | 1 | 0 | 0 | 0 | 1 | 0 | 0 | 0 |
| 00110 | 6 | X | X | X | X | X | X | X | X | 1 | 0 | 0 | 0 | 1 | 0 | 0 | 0 |
| 00111 | 7 | X | X | X | X | X | X | X | X | X | X | X | X | 1 | 0 | 0 | 0 |
| 01000 | 8 | X | X | X | X | X | X | X | X | X | X | X | X | X | X | X | X |
| 01001 | 9 | 0 | 1 | 0 | 0 | X | X | X | X | X | X | X | X | X | X | X | X |
| 01010 | 10 | 0 | 1 | 0 | 0 | 0 | 1 | 0 | 0 | X | X | X | X | X | X | X | X |
| 01011 | 11 | 0 | 1 | 0 | 0 | 0 | 1 | 0 | 0 | 0 | 1 | 0 | 0 | X | X | X | X |
| 01100 | 12 | 0 | 1 | 0 | 0 | 0 | 1 | 0 | 0 | 0 | 1 | 0 | 0 | 0 | 1 | 0 | 0 |
| 01101 | 13 | X | X | X | X | 0 | 1 | 0 | 0 | 0 | 1 | 0 | 0 | 0 | 1 | 0 | 0 |
| 01110 | 14 | X | X | X | X | X | X | X | X | 0 | 1 | 0 | 0 | 0 | 1 | 0 | 0 |
| 01111 | 15 | X | X | X | X | X | X | X | X | X | X | X | X | 0 | 1 | 0 | 0 |
| 10000 | 16 | X | X | X | X | X | X | X | X | X | X | X | X | X | X | X | X |
| 10001 | 17 | 0 | 0 | 1 | 0 | X | X | X | X | X | X | X | X | X | X | X | X |
| 10010 | 18 | 0 | 0 | 1 | 0 | 0 | 0 | 1 | 0 | X | X | X | X | X | X | X | X |
| 10011 | 19 | 0 | 0 | 1 | 0 | 0 | 0 | 1 | 0 | 0 | 0 | 1 | 0 | X | X | X | X |
| 10100 | 20 | 0 | 0 | 1 | 0 | 0 | 0 | 1 | 0 | 0 | 0 | 1 | 0 | 0 | 0 | 1 | 0 |
| 10101 | 21 | X | X | X | X | 0 | 0 | 1 | 0 | 0 | 0 | 1 | 0 | 0 | 0 | 1 | 0 |
| 10110 | 22 | X | X | X | X | X | X | X | X | 0 | 0 | 1 | 0 | 0 | 0 | 1 | 0 |
| 10111 | 23 | X | X | X | X | X | X | X | X | X | X | X | X | 0 | 0 | 1 | 0 |
| 11000 | 24 | X | X | X | X | X | X | X | X | X | X | X | X | X | X | X | X |
| 11001 | 25 | 0 | 0 | 0 | 1 | X | X | X | X | X | X | X | X | X | X | X | X |
| 11010 | 26 | 0 | 0 | 0 | 1 | 0 | 0 | 0 | 1 | X | X | X | X | X | X | X | X |
| 11011 | 27 | 0 | 0 | 0 | 1 | 0 | 0 | 0 | 1 | 0 | 0 | 0 | 1 | X | X | X | X |
| 11100 | 28 | 0 | 0 | 0 | 1 | 0 | 0 | 0 | 1 | 0 | 0 | 0 | 1 | 0 | 0 | 0 | 1 |
| 11101 | 29 | X | X | X | X | 0 | 0 | 0 | 1 | 0 | 0 | 0 | 1 | 0 | 0 | 0 | 1 |
| 11110 | 30 | X | X | X | X | X | X | X | X | 0 | 0 | 0 | 1 | 0 | 0 | 0 | 1 |
| 11111 | 31 | X | X | X | X | X | X | X | X | X | X | X | X | 0 | 0 | 0 | 1 |

Figure 12:
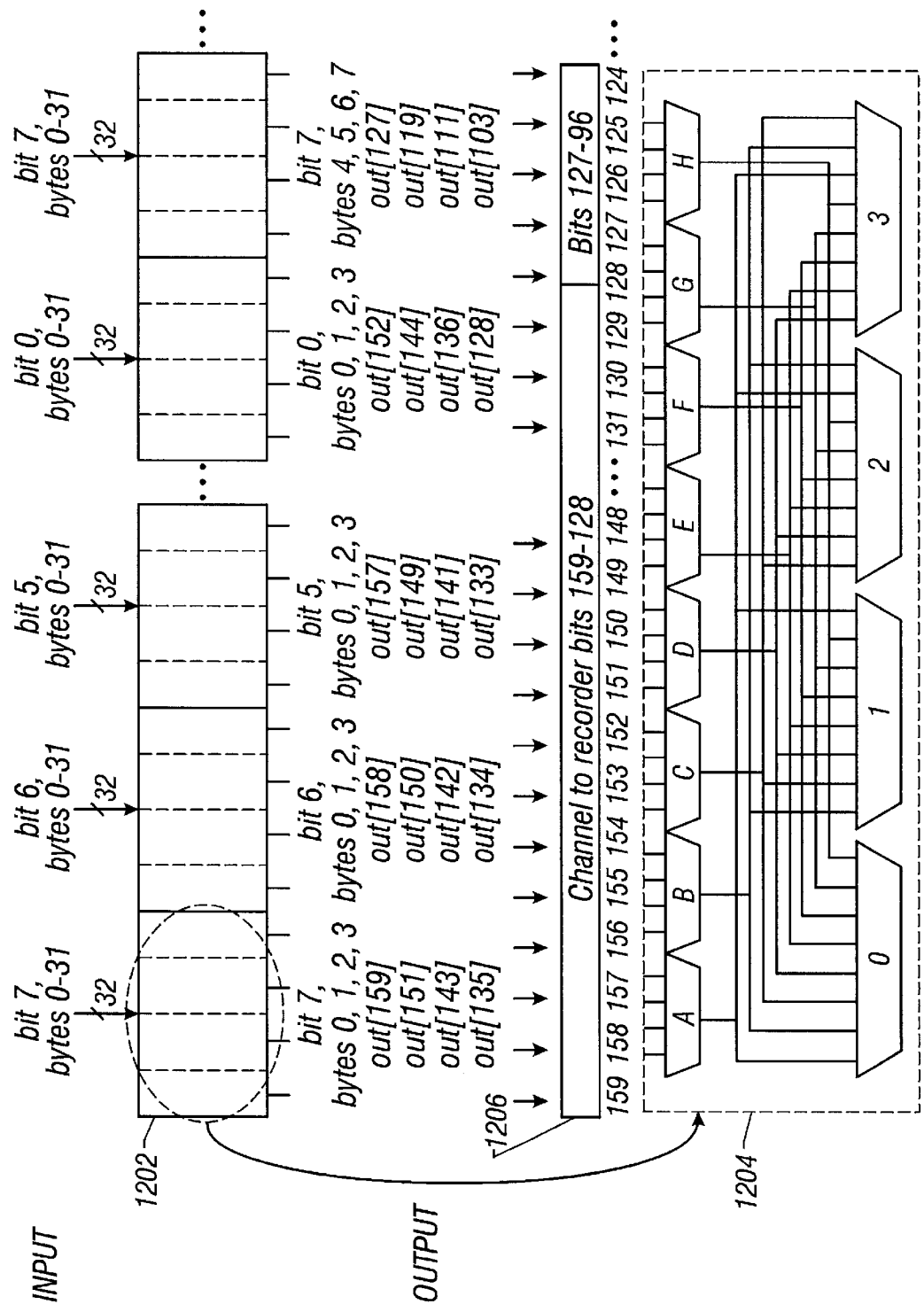
FIG. 12 is a functional diagram of a rotate and truncate physical implementation in accordance with one embodiment of the present invention.

FIG. 12 is a functional diagram of a rotate and truncate physical implementation in accordance with one embodiment of the present invention. The input to the rotate and truncate physical implementation of FIG. 12 is the same or identical for each of the eight 4:1 muxes. By recognizing that each of the inputs to the eight 4:1 muxes are the same (i.e., the same 32 bytes of data), each of the eight 4:1 muxes can be implemented as shown in a block 1204. Block 1204 shows eight 4:1 muxes (A, B, C, D, E, F, G, and H) and four 8:1 muxes (0, 1, 2, and 3). Each of the eight 4:1 muxes is set or controlled in order to output a particular bit n of each selected byte. For example, block 1204 outputs bit 7 of a 4-byte group 1202, and thus, block 1204 outputs bit 7 of bytes 0, 1, 2, and 3, which represents an output of bit 159, bit 151, bit 143, and bit 135. The output is then sent to a channel 1206, which reorders the bits into descending order.

TABLE 4

| AOR | | Muxes A–D | | | | Muxes E–H | | | |
|---|---|---|---|---|---|---|---|---|---|
| | | 0 | 1 | 2 | 3 | 0 | 1 | 2 | 3 |
| 00000 | 0 | 1 | 0 | 0 | 0 | 1 | 0 | 0 | 0 |
| 00001 | 1 | 1 | 0 | 0 | 0 | 1 | 0 | 0 | 0 |
| 00010 | 2 | 1 | 0 | 0 | 0 | 1 | 0 | 0 | 0 |
| 00011 | 3 | 1 | 0 | 0 | 0 | 1 | 0 | 0 | 0 |
| 00100 | 4 | 0 | 1 | 0 | 0 | 1 | 0 | 0 | 0 |
| 00101 | 5 | 0 | 1 | 0 | 0 | 1 | 0 | 0 | 0 |
| 00110 | 6 | 0 | 1 | 0 | 0 | 1 | 0 | 0 | 0 |
| 00111 | 7 | 0 | 1 | 0 | 0 | 1 | 0 | 0 | 0 |
| 01000 | 8 | 0 | 1 | 0 | 0 | 0 | 1 | 0 | 0 |
| 01001 | 9 | 0 | 1 | 0 | 0 | 0 | 1 | 0 | 0 |
| 01010 | 10 | 0 | 1 | 0 | 0 | 0 | 1 | 0 | 0 |
| 01011 | 11 | 0 | 1 | 0 | 0 | 0 | 1 | 0 | 0 |
| 01100 | 12 | 0 | 0 | 1 | 0 | 0 | 1 | 0 | 0 |

TABLE 4-continued

| AOR | | Muxes A–D | | | | Muxes E–H | | | |
|---|---|---|---|---|---|---|---|---|---|
| | | 0 | 1 | 2 | 3 | 0 | 1 | 2 | 3 |
| 01101 | 13 | 0 | 0 | 1 | 0 | 0 | 1 | 0 | 0 |
| 01110 | 14 | 0 | 0 | 1 | 0 | 0 | 1 | 0 | 0 |
| 01111 | 15 | 0 | 0 | 1 | 0 | 0 | 1 | 0 | 0 |
| 10000 | 16 | 0 | 0 | 1 | 0 | 0 | 0 | 1 | 0 |
| 10001 | 17 | 0 | 0 | 1 | 0 | 0 | 0 | 1 | 0 |
| 10010 | 18 | 0 | 0 | 1 | 0 | 0 | 0 | 1 | 0 |
| 10011 | 19 | 0 | 0 | 1 | 0 | 0 | 0 | 1 | 0 |
| 10100 | 20 | 0 | 0 | 0 | 1 | 0 | 0 | 1 | 0 |
| 10101 | 21 | 0 | 0 | 0 | 1 | 0 | 0 | 1 | 0 |
| 10110 | 22 | 0 | 0 | 0 | 1 | 0 | 0 | 1 | 0 |
| 10111 | 23 | 0 | 0 | 0 | 1 | 0 | 0 | 1 | 0 |
| 11000 | 24 | 0 | 0 | 0 | 1 | 0 | 0 | 0 | 1 |
| 11001 | 25 | 0 | 0 | 0 | 1 | 0 | 0 | 0 | 1 |
| 11010 | 26 | 0 | 0 | 0 | 1 | 0 | 0 | 0 | 1 |
| 11011 | 27 | 0 | 0 | 0 | 1 | 0 | 0 | 0 | 1 |
| 11100 | 28 | 1 | 0 | 0 | 0 | 0 | 0 | 0 | 1 |
| 11101 | 29 | 1 | 0 | 0 | 0 | 0 | 0 | 0 | 1 |
| 11110 | 30 | 1 | 0 | 0 | 0 | 0 | 0 | 0 | 1 |
| 11111 | 31 | 1 | 0 | 0 | 0 | 0 | 0 | 0 | 1 |

The logic equations for the mux selects of the 4:1 muxes are as follows:

Muxes A–D, Sel0=(!AOR[4]&& !AOR[3]&& !AOR[2]) II (AOR[4]&& AOR[3]&& AOR2);

Muxes A–D, Sel1=(!AOR[4]&& !AOR[3]&& AOR[2]) II (!AOR[4]&& AOR[3]&& !AOR2);

Muxes A–D, Sel2=(!AOR[4]&& AOR[3]&& AOR[2]) II (AOR[4]&& !AOR[3]&& !AOR2);

Muxes A–D, Sel3=(AOR[4]&& !AOR[3]&& AOR[2]) II (AOR[4]&& AOR[3]&& !AOR2);

Muxes E–H, Sel0=!AOR[4]&& !AOR[3];

Muxes E–H, Sel1=!AOR[4]&& AOR[3];

Muxes E–H, Sel2=AOR[4]&& !AOR[3]; and

Muxes E–H, Sel3=AOR[4]&& AOR[3].

The 8:1 mux control is much simpler as a result of the routing of the 4:1 mux outputs.

This routing can be seen in FIG. 9. The logic equations for the mux selects of the 8:1 muxes are as follows:

Muxes 0–3, Sel0=!AOR[2]&& !AOR[1]&& !AOR[0];

Muxes 0–3, Sel1=!AOR[2]&& !AOR[1]&& AOR[0];

Muxes 0–3, Sel2=!AOR[2]&& AOR[1]&& !AOR[0];

Muxes 0–3, Sel3=!AOR[2]&& AOR[1]&& AOR[0];

Muxes 0–3, Sel4=AOR[2]&& !AOR[1]&& !AOR[0];

Muxes 0–3, Sel5=AOR[2]&& !AOR[1]&& AOR[0];

Muxes 0–3, Sel6=AOR[2]&& AOR[1]&& !AOR[0]; and

Muxes 0–3, Sel7=AOR[2]&& AOR[1]&& AOR[0].

Figure 13:
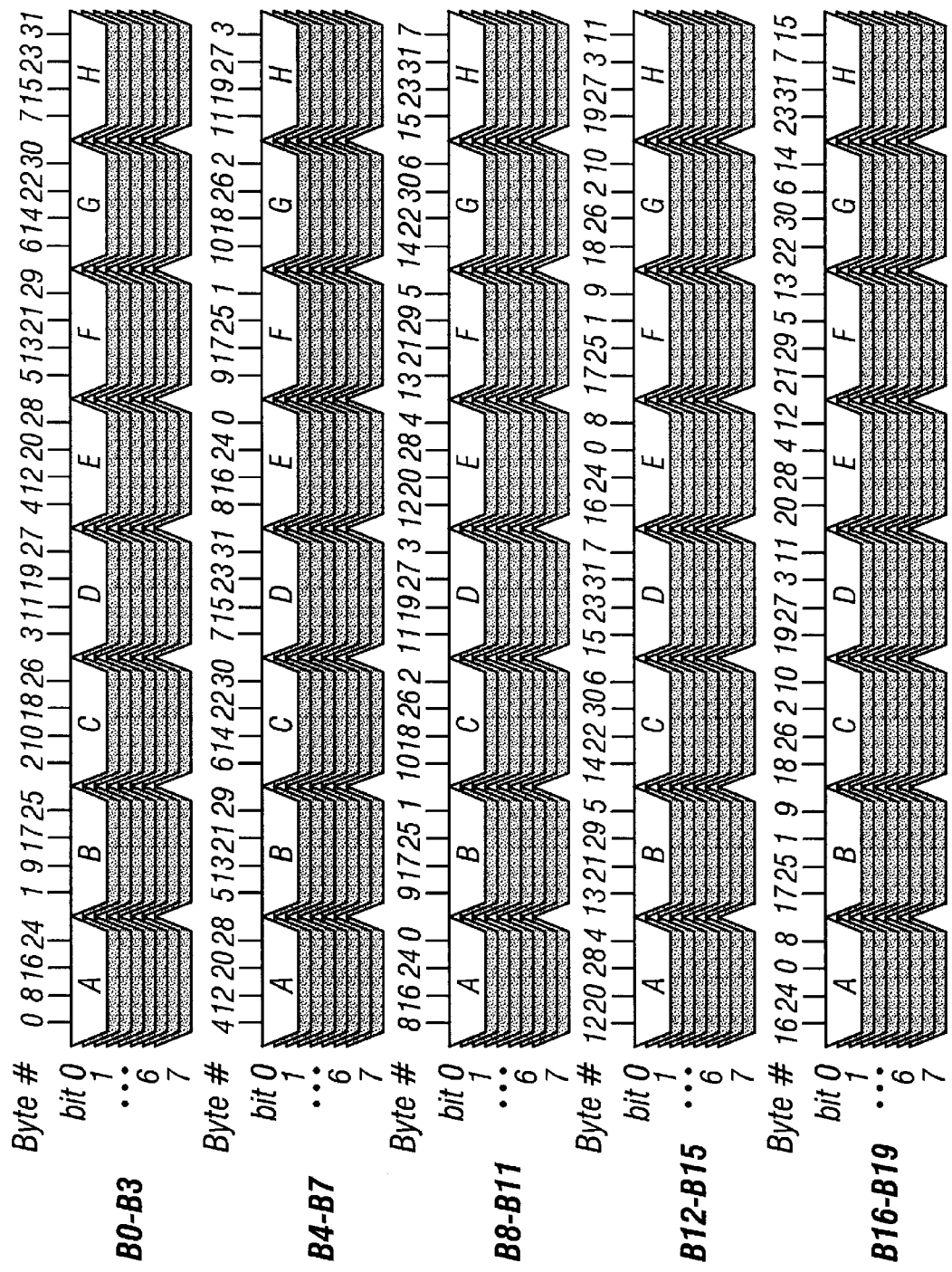
FIG. 13 is a functional diagram of an input byte ordering of each four byte group that allows the mux's select control signals to be shared in accordance with one embodiment of the present invention.

FIG. 13 is a functional diagram of an input byte ordering for each 4-byte group that allows the mux's select control signals to be shared in accordance with one embodiment of the present invention. For example, for bytes 0–3 (B0–B3), 8:1 mux A selects bits 0–7 from bytes 0, 8, 16, and 24, 8:1 mux B selects bits 0–7 from bytes 1, 9, 17 and 25, . . . , and 8:1 mux H selects bits 0–7 from bytes 7, 15, 23, and 31. Accordingly, the input byte ordering for each four-byte group advantageously allows the mux selects to be shared as discussed above.

Figure 14:
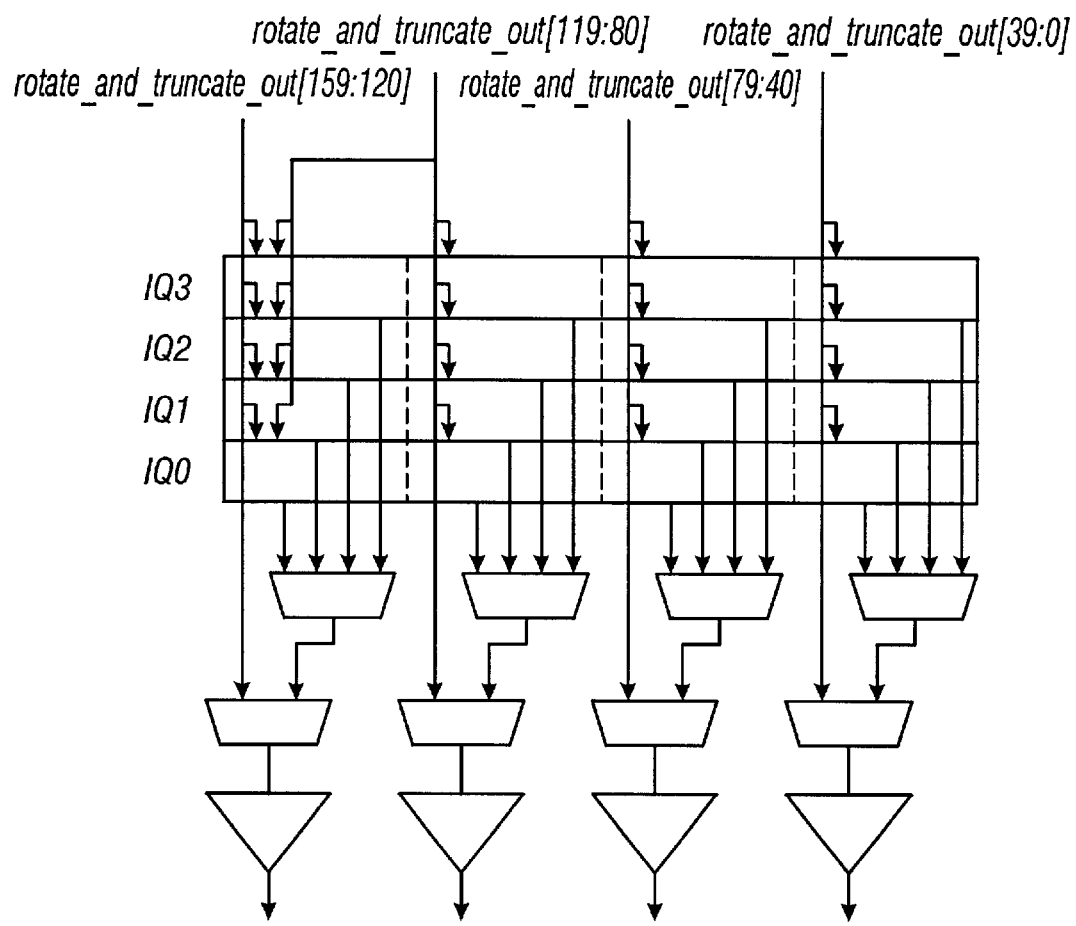
FIG. 14 is a block diagram of the instruction queue of FIG. 3 shown in greater detail in accordance with one embodiment of the present invention.

FIG. 14 is a block diagram of instruction queue 302 shown in greater detail in accordance with one embodiment of the present invention. Instruction queue 302 is a four-entry instruction queue that provides a decoupling buffer between instruction fetch unit 108 and processors 110 and 112. As discussed above, every cycle, instruction fetch unit 108 provides an instruction packet (e.g., a VLIW packet). The instruction packet is passed onto the processors for execution if the processors are ready for a new instruction. For example, in two cases, a VLIW packet is produced that cannot be executed immediately. First, if the execution pipeline is stalled (e.g., for load dependency), then the VLIW packet is written to instruction queue 302. Second, when a pair of instructions for a particular processor such as the GFU is present, only one GFU instruction can be executed, and the other GFU instruction is queued in instruction queue 302. When the instruction fetch pipeline is stalled due to an instruction cache miss, for example, some of the penalty for the instruction fetch pipeline stall can be hidden by having valid entries buffered in instruction queue 302.

Instruction queue 302 is a four-entry FIFO (First In First Out) queue that can be implemented as a static register file. Control logic in instruction fetch unit 108 can provide FIFO pointers. The tail entry of instruction queue 302 can be written with either rotate and truncate unit 611 or the second instruction of a GFU pair (e.g., RAT_OUT [119:80]). A read can be implemented using a 4:1 mux in instruction queue 302. Thus, bits 159–120 of instruction queue 302 can be written with either the second instruction of a GFU pair or the output of rotate and truncate unit 611. The rest of the bits (i.e., bits 119:0) can be written with the output of rotate and truncate unit 611.

Although particular embodiments of the present invention have been shown and described, it will be obvious to those skilled in the art that changes and modifications can be made without departing from the present invention in its broader aspects, and therefore, the appended claims are to encompass within their scope all such changes and modifications that fall within the true scope of the present invention.

What is claimed is:

1. An apparatus for an instruction fetch unit aligner of a microprocessor, comprising:

selection logic of an instruction aligner that extracts and aligns a non-power of two size instruction from power of two size instruction data, the non-power of two size instruction being a Very Long Instruction Word (VLIW); and control logic of the instruction aligner for controlling the selection logic, wherein the instruction aligner receives the power of two size instruction data from a plurality of line buffers;

wherein the selection logic comprises multiplexer logic for selecting the non-power of two size instruction from among the plurality of line buffers.

2. The apparatus of claim 1 wherein the extraction and alignment of the non-power of two size instruction from the power of two size instruction data is performed within one clock cycle of the microprocessor.

3. The apparatus of claim 2 wherein the multiplexer logic comprises eight 4:1 multiplexers and four 8:1 multiplexers for every 4 bits of the power of two size instruction data.

4. The apparatus of claim 3 wherein the multiplexer logic further comprises:

four 2:1 multiplexers that each select 8 bytes to provide the power of two size instruction data.

5. The apparatus of claim 3 further comprising a routing channel that reorders the bits output from the multiplexer logic.

6. The apparatus of claim 1 wherein the power of two size instruction data comprises 32 bytes of data, and the non-power of two size instruction comprises 5, 10, 15, or 20 bytes of instruction data.

7. The apparatus of claim 1 wherein the non-power of two size instruction comprises an instruction packet that comprises a packet header, the packet header indicating a number of instructions in the instruction packet.

8. The apparatus of claim 1, wherein:

the non-power of two size instruction is a VLIW packet comprising M instructions, where 1<M<N;

each of the plurality of line buffers comprises N segments; and the multiplexer logic for selecting the non-power of two size instruction from among the plurality of line buffers further comprises multiplexer logic for selecting, for each of the N segments, the contents of only one of the plurality of line buffers.

9. An apparatus for an instruction fetch unit aligner of a microprocessor, comprising:

selection logic of the instruction aligner that extracts and aligns a non-power of two size instruction from power of two size instruction data, the non-power of two size instruction being a Very Long Instruction Word (VLIW); and control logic of the instruction aligner for controlling the selection logic, wherein the control logic comprises a decoder, and wherein the instruction aligner receives the power of two size instruction data from a plurality of line buffers;

wherein the selection logic comprises multiplexer logic for selecting the non-power of two size instruction from among the plurality of line buffers.

10. The apparatus of claim 9 wherein the extraction and alignment of the non-power of two size instruction from the power of two size instruction data is performed within one clock cycle of the microprocessor.

11. The apparatus of claim 10 wherein the multiplexer logic comprises eight 4:1 multiplexers and four 8:1 multiplexers for every 4 bits of the power of two size instruction data.

12. The apparatus of claim 11 wherein the multiplexer logic further comprises:

four 2:1 multiplexers that each select 8 bytes to provide the power of the two size instruction data.

13. The apparatus of claim 11 further comprising a reorder channel that reorders the bits output from the multiplexer logic.

14. The apparatus of claim 9 wherein the control logic is optimized.

15. The apparatus of claim 9 wherein the power of two size instruction data comprises 32 bytes of instruction data.

16. The apparatus of claim 9 wherein the instruction aligner is implemented as a megacell.

17. The apparatus of claim 9 wherein the non-power of two size instruction comprises an instruction packet that comprises a packet header, the packet header indicating a number of instructions in the instruction packet.

18. The apparatus of claim 9, wherein:

the non-power of two size instruction is a VLIW packet comprising M instructions, where 1<M<N;

each of the plurality of line buffers comprises N segments; and the multiplexer logic for selecting the non-power of two size instruction from among the plurality of line buffers further comprises multiplexer logic for selecting, for each of the N segments, the contents of only one of the plurality of line buffers.

* * * * *

UNITED STATES PATENT AND TRADEMARK OFFICE
CERTIFICATE OF CORRECTION

PATENT NO.    : 6,249,861 B1
DATED         : June 19, 2001
INVENTOR(S)   : Marc Tremblay, Frank C. Chiu and Graham R. Murphy It is certified that error appears in the above-identified patent and that said Letters Patent is hereby corrected as shown below:

Column 14,
Line 21, please delete "RAT_OUT" and insert -- RotateandTruncate_OUT --.

Signed and Sealed this

Seventh Day of May, 2002

Attest:

Attesting Officer

JAMES E. ROGAN
Director of the United States Patent and Trademark Office